United States Patent [19]

O'Connell

[11] Patent Number: 5,060,260

[45] Date of Patent: Oct. 22, 1991

[54] MOUNTING CRADLE FOR A PORTABLE CELLULAR TELEPHONE

[76] Inventor: Joseph J. O'Connell, 830-G Live Oak, N. E., Albuquerque, N. Mex. 87122

[21] Appl. No.: 558,090

[22] Filed: Jul. 24, 1990

[51] Int. Cl.$^5$ ............................................. H04M 1/00
[52] U.S. Cl. .................................... 379/454; 379/455; 379/426
[58] Field of Search ............... 379/454, 426, 428, 447, 379/448, 446, 424, 440, 436, 455, 457; 248/278, 284, 670, 316.4; 206/320, 591; 455/89, 90; D14/251

[56] References Cited

U.S. PATENT DOCUMENTS

| | | | |
|---|---|---|---|
| D. 308,307 | 7/1990 | Sigurdson | D14/251 |
| 1,291,169 | 1/1914 | Ruggles | 379/446 |
| 2,481,271 | 9/1949 | Willey | 179/148 |
| 2,592,066 | 4/1952 | Pratt | 379/447 |
| 3,184,548 | 5/1965 | Krulwich | 179/148 |
| 4,406,928 | 9/1983 | MacKenzie | 179/146 R |
| 4,454,387 | 6/1984 | Danielson et al. | 179/146 R |
| 4,472,606 | 9/1984 | Krolopp et al. | 179/146 R |
| 4,543,451 | 9/1985 | Schoen | 179/2 EA |
| 4,560,831 | 12/1985 | Bast et al. | 379/454 |
| 4,747,136 | 5/1988 | Kiesewetter | 377/455 |
| 4,771,927 | 9/1988 | Ventura | 224/252 |
| 4,776,553 | 10/1988 | Kobayashi | 248/558 |
| 4,797,916 | 1/1989 | Kojima | 379/454 |
| 4,945,561 | 7/1990 | Rioux Jr. | 379/454 |

FOREIGN PATENT DOCUMENTS

| | | | |
|---|---|---|---|
| 0586547 | 11/1959 | Canada | 379/446 |
| 72100350 | 7/1971 | Fed. Rep. of Germany | 379/455 |
| 0292898 | 11/1988 | Japan | 379/435 |

OTHER PUBLICATIONS

Advertisements of mounts of TEC Cellular Technology by Cellular Antenna Co. called "Quick Release Plate"; and Multi-Position Head-Mount of ORA Electronics All in Mobile Product News, Apr. 1990 issue.

Primary Examiner—Jin F. Ng
Assistant Examiner—Jason Chan
Attorney, Agent, or Firm—Deborah A. Peacock; Donovan F. Duggan

[57] ABSTRACT

A mounting cradle for mounting a portable cellular telephone in a vehicle. The cradle is adjustable in width, length and height, by a single pair of fasteners, to accommodate portable cellular telephones of varying sizes. The cradle and an associated cradle mount enable the telephone to be selectively and removably positioned at an angular orientation extending through a full 360 degrees, and also allow the cradle and telephone to be tilted through a substantial angle. The cradle has an adjustable compression spring, characterized by two levels of spring tension, for accommodating varying shock and vibration conditions.

20 Claims, 4 Drawing Sheets

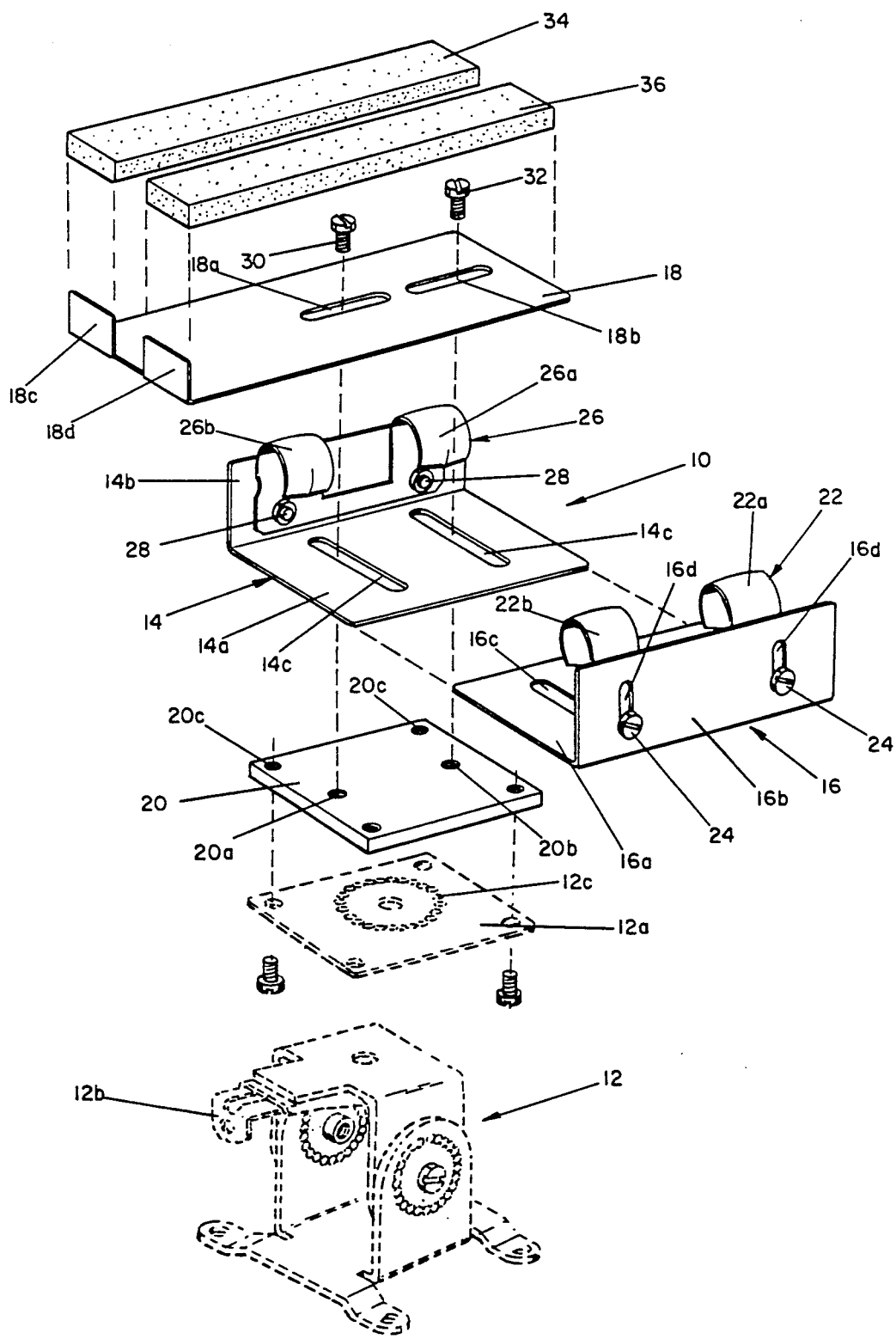
FIG—3

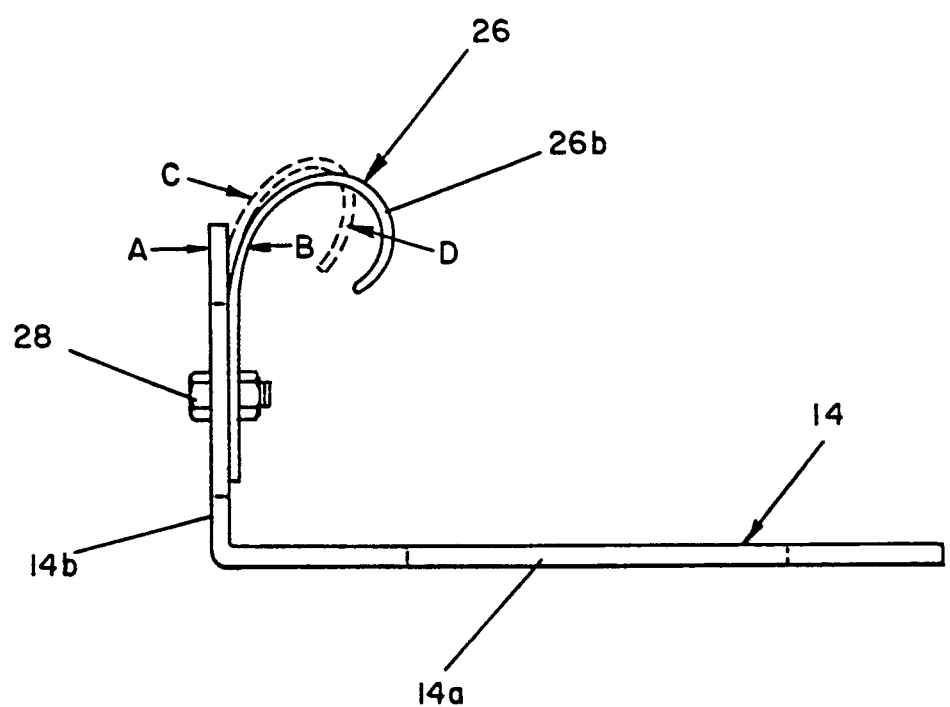
FIG — 4

1

MOUNTING CRADLE FOR A PORTABLE CELLULAR TELEPHONE

CROSS-REFERENCE TO RELATED APPLICATIONS

The invention disclosed and claimed herein is generally related in subject matter to the applicant's previously filed pending patent application on the invention entitled "Telephone Handset Cradle Mount," filed June 21, 1990, Ser. No. 07/542,258, which is hereby incorporated by reference for all that it discloses.

BACKGROUND OF THE INVENTION

1. Field of the Invention (Technical Field)

The invention described and claimed herein is generally related to mounting devices for telephones and the like. More particularly the present invention is related to mounts for supporting a portable cellular telephone, in a vehicle or elsewhere.

2. Description of the Related Art Including Information Disclosed under 37 C.F.R. §§1.97-1.99 (Background Art)

The present invention is directed to portable cellular telephones, which are those cellular telephones in which the conventional telephone handset and transceiver are combined in a single handset unit. Portable cellular telephones are sufficiently compact to be carried in a briefcase, and can generally be operated anywhere. They differ from other cellular telephones commonly installed in vehicles, in that the handset of the portable cellular telephone includes a battery and transceiver and thus constitutes essentially the entire telephone unit.

Portable cellular telephones can ordinarily be operated from within a vehicle, in much the same manner as a non-portable cellular telephone that is typically installed semi-permanently in the vehicle. In this regard, however, it is desirable to be able to actuate the portable cellular telephone with electrical power from the electrical system of the vehicle. This is because portable cellular telephones, in order to be kept to a desirably small size, typically have a relatively small rechargeable battery that significantly limits the time period over which the telephone may be operated. Consequently, it is desirable to be able to continuously recharge the battery and/or directly power the portable cellular telephone while it is carried in a vehicle. This may be done by conventional means connecting the portable cellular telephone to the electrical system of the vehicle, for example through the vehicle cigarette lighter.

Further, where a portable cellular telephone is regularly carried in a vehicle, it is desirable to have the telephone removably mounted in a position where it may be conveniently accessed and removed for use, and which is also suitable for holding the telephone during recharging or other electrical actuation. There has not heretofore been available a cellular telephone mount which achieves these objectives and which is also adaptable for use in various vehicles, which may have widely varying interior dimensions, shapes and sizes. In this regard, vehicles have dashboards of different sizes, shapes and orientations. Additionally, some vehicles with bucket seats have middle consoles or transmission housings of various sizes and shapes, which are generally positioned centrally between the front seats or below the dashboard. These differences in vehicle configuration, coupled with varying personal preferences as to the location of the telephone handset, has created a need for a mounting device for portable cellular telephones, which can enable the telephone to be mounted in any of a number of different positions and orientations within the cab of the vehicle.

Previously available mounting devices for cellular telephones have been directed to very specific applications, and have generally been useful only in connection with the handsets of non-portable cellular telephones.

For example, U.S. Pat. No. 4,776,553, to Kobayashi, describes a clamshell-type cradle mount for a telephone handset which has only a very limited rotational adjustment range in two directions and very little standoff from the mounting surface.

U.S. Pat. No. 4,797,916, to Kojima, also discloses a telephone handset cradle mount, which is pivotable in one dimension and over a limited angular range.

U.S. Pat. No. 4,406,928, to MacKenzie, discloses a holder for a conventional wall- or desk-mounted telephone.

SUMMARY OF THE INVENTION

(DISCLOSURE OF THE INVENTION)

Accordingly, the present invention provides a mounting cradle for a portable cellular telephone. The cradle is particularly adapted for use in a vehicle, by being installed in combination with the cradle mount disclosed in the applicant's above-referenced patent application.

The cradle includes an elongate base plate, which includes at least one, but preferably two longitudinal slots therein, and a pair of first and second side plates. Each of the side plates include an integral upright side segment and an integral base segment extending transversely with respect to one another. The base segments have at least one, but preferably two transverse slots therein. The cradle further includes a pair of inwardly directed compression springs affixed respectively to the side segments of the side plates, and fastening structure extending through the slots in the base plate and in the base segments, for fastening the base plate and the plates to a cradle mount.

The cradle preferably further includes a nut plate and at least two fasteners engageable with the nut plate, with the fasteners passing through the longitudinal slots in the base plate and through the transverse slots in the base segments of the side plates, so as to adjustably affix the base plate and the side plates to the nut plate, and wherein the nut plate further includes means for fastening the said nut plate to a cradle mount.

The compression spring means preferably includes dual spring heads, which are preferably affixed to the side segments of the side plates by fasteners engaged in upright slots in the side segments, whereby the height of the compression spring means may be selectively adjusted. The compression spring heads are preferably convexly curved to avoid edges of the spring heads from engaging and possibly scratching a telephone housing.

The spring heads may have two levels of spring tension resulting from two radii of curvature, with the spring heads having a first radius of curvature extending away from the side segments so as to provide a relatively low level of spring tension, and the spring heads each having a curled end having a second, smaller radius of curvature which provides a higher level of spring tension. With this arrangement the side plates may be selectively adjusted so as to apply either the high level of spring tension or the low level of spring tension to a telephone mounted in the cradle.

The cradle base plate preferably includes a pair of spaced apart transverse extending feet to support a portable cellular telephone while also allowing the telephone to be connected to an electrical power source. The base plate may also include a pair of elongate elastomeric pads adhered thereto.

Accordingly, it is the object and purpose of the present invention to provide a mount for a portable cellular telephone, which is particularly adapted for installation in a variety of positions and orientations within a vehicle, and which will removably support a portable cellular telephone in a convenient, readily accessible position.

It is also an object and purpose to provide a mount which achieves the foregoing objects and purposes, and which enables a portable cellular telephone to be recharged and/or actuated by a conventional connection to the electrical system of the vehicle.

It is yet another object and purpose to provide a mount which achieves the foregoing objects and purposes, and which is adjustable with respect to variations in width, length and height of a portable cellular telephone.

Additional objects and purposes of the present invention are to provide a mount for a portable cellular telephone which resists the ordinary vibrations and shocks of a motor vehicle, and to provide a mount which may be selectively adjusted to receive portable cellular telephones of different sizes and shapes.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

In the Figures:

FIG. 3 is an exploded isometric view of the embodiment shown in FIG. 1; and

FIG. 4 is a detailed side view showing the operation of the compression springs in the embodiment shown in FIGS. 1 through 3.

DETAILED DESCRIPTION OF THE PREFERRED EMBODIMENTS OF THE INVENTION (BEST MODES FOR CARRYING OUT THE INVENTION)

Figure 1:
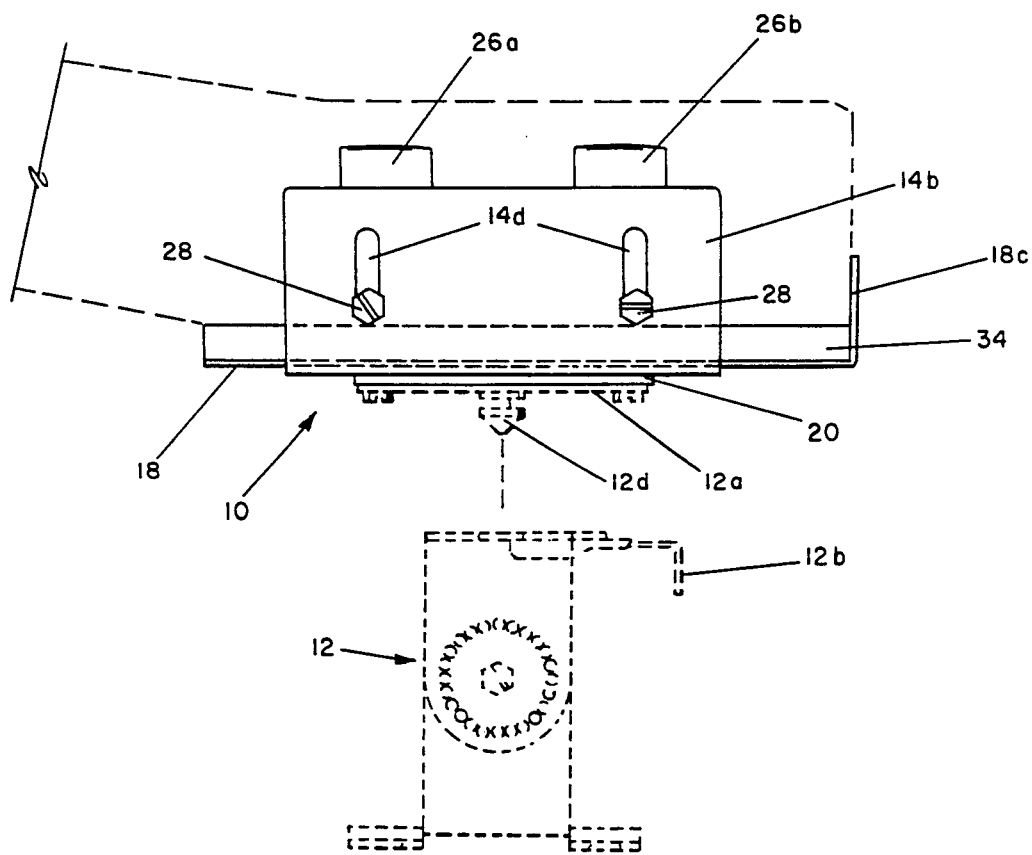
FIG. 1 is a side view of the preferred embodiment of the mounting cradle of the present invention, shown with a portable cellular telephone and the applicant's previously disclosed cradle mount shown in phantom outline.
Figure 2:
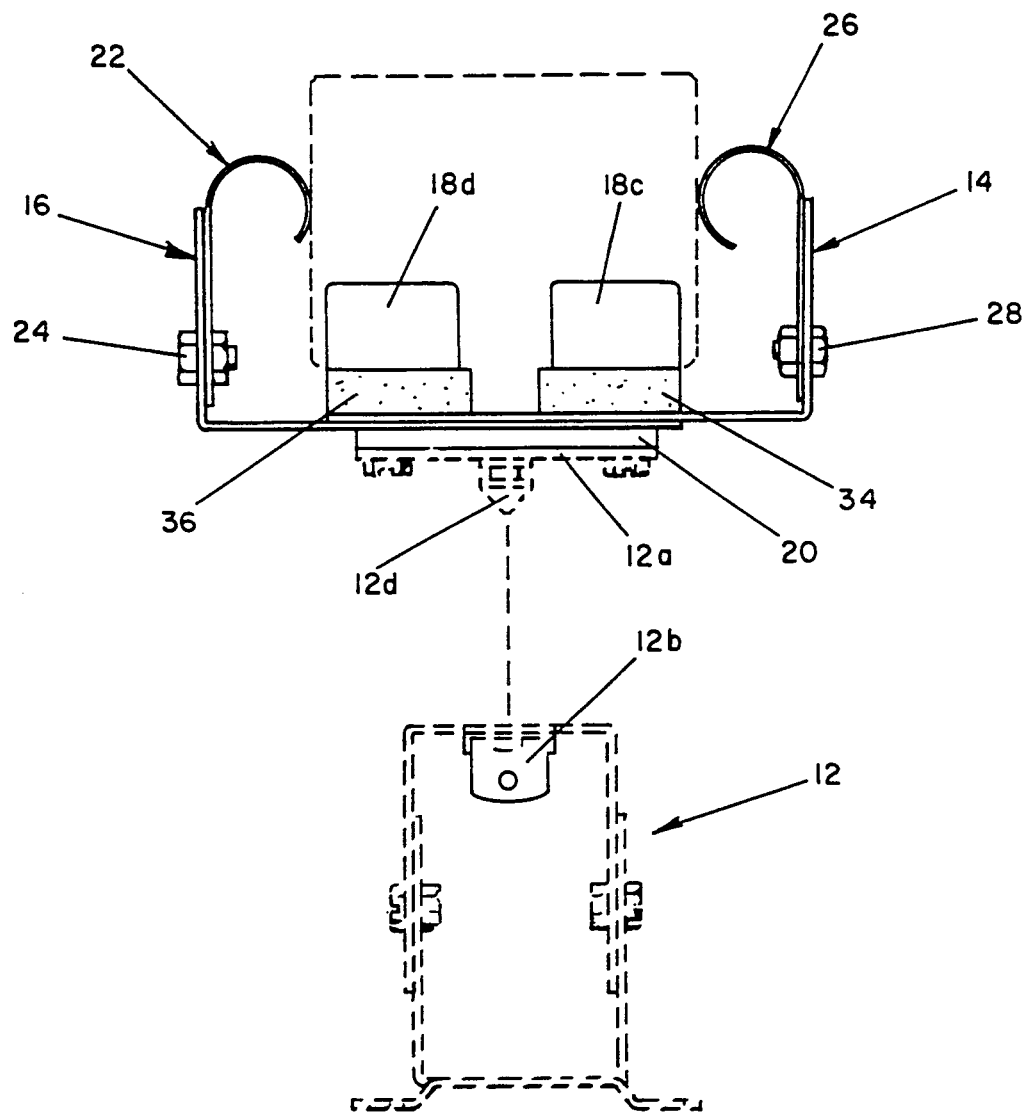
FIG. 2 is an end view of the embodiment shown in FIG. 1.

Referring to FIGS. 1 through 3, there is illustrated a first preferred embodiment of a portable cellular telephone mount cradle 10 constructed in accordance with the present invention. The cradle 10 is adapted to support and retain a portable cellular telephone, as shown in phantom outline in FIG. 1.

The cradle 10 is particularly adapted for use in combination with a cradle mount 12, which is illustrated in phantom outline in the Figures. The illustrated cradle mount 12 has been previously described and claimed in the applicant's previously filed application Ser. No. 07/542,258. Briefly, the cradle mount 12 is adapted for installation on the top or front of a vehicle dashboard, or on a console, transmission housing or other convenient location within the cab of a vehicle. The cradle mount 12 includes a cradle mounting plate 12a, which is tiltable and rotatable, and which is removable by means of a snap slide fastener 12b. Plate 12a includes detents 12c which permit rotational adjustment of the position of the plate 12a. The mounting plate 12a is provided with a standard snap slide stud 12d (FIGS. 1 and 2), by which it is engaged with the snap slide fastener 12b.

The mounting cradle 10 generally includes a pair of first and second side plates 14 and 16, and a cooperable base plate 18. The side plates 14 and 16 and the base plate 18 are affixed to one another and to the cradle mount 12 by means of a nut plate 20 and associated fasteners, as further described below.

The side plates 14 and 16 are each formed of a material, such as steel sheet stock, bent into right angles, so as to include an integral base segment 14a and 16a, and an integral side segment 14b and 16b, respectively. The base segments 14a and 16a each include a pair of transverse slots 14c and 16c, respectively.

The side segments 14b and 16b each include a pair of vertical slots, 14d and 16d, respectively. Side segment 16b supports a dual pressure spring 22, which is attached to the side segment 16b by a pair of fasteners 24, which pass through the vertical slots 16d. The opposite side segment 14b likewise supports a dual pressure spring 26, which is attached by fasteners 28. The springs 22 and 26 are adjustable in height by means of the vertical slots 14d and 16d, respectively.

The base plate 18 includes two longitudinal slots 18a and 18b. In assembly, the side plates 14 and 16 are positioned such that their base segments 14a and 16a overlap one another with the transverse slots 14c and 16c being in partial alignment with one another. The base plate 18 is positioned over the overlapping base segments 14a and 16a, and a pair of threaded fasteners 30 and 32 pass through the longitudinal slots 18a and 18b, as well as the transverse slots 14c and 16c. The threaded fasteners 30 and 32 engage cooperably threaded bores 20a and 20b formed in the nut plate 20.

It will be seen that loosening of the fasteners 30 and 32 permits the base plate 18 to be moved longitudinally over the range defined by the lengths of the slots 18a and 18b, thereby accommodating cellular telephones of varying lengths and also permitting the resting position of the telephone to be adjusted longitudinally for optimum convenience. Likewise, loosening of the fasteners 30 and 32 also permits the side plates 14 and 16 to be slid inward or outward to accommodate telephones of varying widths, and also to adjust the tension applied by the pressure springs 22 and 26. These lateral and longitudinal adjustments can be made simultaneously, with the desired positions being set by simply tightening the fasteners 30 and 32.

The base plate 18 further includes two integral, spaced-apart feet 18c and 18d, which are bent outward from the plate 18 at right angles. The feet 18c and 18d support the base of a cellular telephone and prevent the telephone from sliding downwardly along the base plate 18. The slot between the feet 18c and 18d permits the base of the telephone to be connected to an electrical connecting wire, which will typically run to the cigarette lighter of the vehicle, while supported in the cradle 10.

The base plate 18 is further provided with two elongate elastomeric pads 34 and 36, which extend substantially the length of the base plate 18 and which are generally aligned with the feet 18c and 18d. The pads 34 and 36 are adhered to the base plate with a suitable adhesive. The pads 34 and 36 function to insulate a cellular telephone from vehicle vibrations and shocks. The pads 34 and 36 are spaced apart from one another to allow access to the adjustment fasteners 30 and 32, while also spacing the back surface of the cellular telephone from the fasteners 30 and 32.

The dual compression springs 22 and 26 each include two integral compression heads, 22a and 22b, and 26a and 26b, respectively. The compression heads 22a,b and 26a,b are convexly curved on their interior-facing surfaces abutting the telephone, so that there are no metal edges in contact with the telephone housing.

The compression springs 22 and 26 provide two levels of spring tension, as illustrated in FIG. 4. For light spring pressure, as might be desired in city driving, the side plates 14 and 16 may be adjusted so that only the gap represented by the dimension A-B in FIG. 4 is closed when the telephone is inserted in the cradle. For higher spring tension, as might be desired for rough roads or in a small motorboat, the side plates 14 and 16 would be set closer together, so that the gap A-B is closed and the dimension C-D is also reduced upon insertion of the telephone. It will be seen that, due to the different radii of curvature in the spring 26, a greater amount of force is exerted when gap A-B is closed and gap C-D is also reduced, than when only gap A-B is closed.

The nut plate 20 includes four threaded bores 20c, located at the corners of the plate, which are positioned to match the standard hole pattern for cellular telephone cradles. This arrangement enables the nut plate 20 to be fitted to the cradle mounting plate 12a, which is also provided with a standard hole pattern so that it may support either the cradle 10 of the present invention, including nut plate 20, as well as other handset cradles for conventional cellular telephones.

It will be appreciated that the cradle 10 can be positioned in any one of a number of orientations on the cradle mount 12. More specifically, the mounting plate 12a and the cradle 10 can be both tilted with respect to the fixed base plate 12, and can also be rotated axially with respect to the base plate 12, thereby allowing a wide variety of fully adjustable telephone mounting positions for ease of access and use.

It will be appreciated that the preferred embodiment of the mounting cradle described above enables a portable cellular telephone to be positioned and oriented in a wide variety of vehicles, while also obtaining comfortable, convenient and fully adjustable positioning of the cradle. The swivel and lock assembly of the underlying cradle mount 12 provide strong and vibration-resistant connection between the several mount 12 and the cradle 10, thereby augmenting the vibration and shock resistant features of the cradle 10.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A cradle for a portable telephone, comprising:
   an elongate base plate;
   a pair of first and second side plates affixed to said elongate base plate;
   inwardly directed compression spring means affixed to at least one side plate; and
   fastening means for fastening said elongate base plate to a cradle mount to accommodate a portable telephone, wherein said elongate base plate comprises slot means therein for adjusting the position of said elongate base plate.

2. The invention of claim 1 wherein said slot means comprises longitudinal slot means for providing longitudinal adjustment of said elongate base plate.

3. The invention of claim 1 wherein at least one of said side plates comprises an integral upright side segment and an integral base segment extending transversely.

4. The invention of claim 3 wherein said upright side segment and said base segment of said side plate are at approximately a right angle to each other.

5. The invention of claim 3 wherein at least one said base segment of said side plates comprises slot means therein for adjusting the position of said side plates.

6. The invention of claim 5 wherein said slot means comprises transverse slot means for providing transverse adjustment of said side plates relative to each other.

7. The invention of claim 3 wherein:
   said elongate base plate comprises first slot means therein;
   at least one said base segment of said side plates comprises second slot means corresponding thereto; and
   said fastening means extends through said first slot means in said elongate base plate and through said second slot means in said base segment of said side plate to accommodate cellular telephones of varying sizes and shapes.

8. The invention of claim 7 wherein said first slot means comprises longitudinal slot means for providing longitudinal adjustment of the relative positioning of said side and elongate base plates.

9. The invention of claim 7 wherein said second slot means comprises transverse slot means for providing transverse adjustment of the relative positioning of said side and elongate base plates.

10. The invention of claim 7 wherein said first slot means comprises longitudinal slot means and said second slot means comprises transverse slot means for providing longitudinal and transverse adjustments of the relative positioning of said side and elongate base plates.

11. The invention of claim 7 wherein said fastening means comprises a nut plate and at least one fastener engageable with said nut plate, said fastener passing through said first slot means in said elongate base plate and through said second slot means in said base segment of said side plate so as to provide for adjustably affixing said elongate base plate and said side plate to said nut plate, and wherein said nut plate further comprises means for fastening said nut plate to the cradle mount.

12. The invention of claim 1 wherein said fastening means comprises threaded fasteners.

13. The invention of claim 1 wherein said compression spring means comprises at least one pair of opposing compression springs, with at least one compression spring affixed to each of said side plates.

14. The invention of claim 1 wherein said compression spring means is affixed to said side plate by at least one fastener engaged in an upright slot in one of said side plates, whereby the height of said compression spring means may be selectively adjusted.

15. The invention of in claim 1 wherein said compression spring means comprises dual spring head means.

16. The invention of claim 15 wherein said spring head means is convexly curved to prevent edges of said spring heads from engaging a telephone housing.

17. The invention of claim 15 wherein said spring head means comprises two levels of spring tension resulting from two radii of curvature, said spring head means comprising a first radius of curvature extending away from said side plates so as to provide a relatively low level of spring tension, and said spring head means further comprising a curled end having a second, smaller radius of curvature to provide a higher level of spring tension.

18. The invention of claim 1 wherein said base plate comprises foot extension means to support the portable telephone.

19. The invention of claim 18 wherein said foot extension means comprises a pair of spaced apart transverse extending feet to support the portable telephone while also allowing the telephone to be connected to an electrical power source.

20. The cradle defined in claim 1 wherein said base plate comprises one or more elongate elastomeric pads adhered thereto.

* * * * *